US010621615B2

(12) United States Patent
Tuteja et al.

(10) Patent No.: US 10,621,615 B2
(45) Date of Patent: Apr. 14, 2020

(54) REAL-TIME STREAMING PROCESSOR TO SERVE HIGH VOLUME TRAFFIC PAGES SUCH AS SEARCH AND RECOMMENDATION

(71) Applicant: WAL-MART STORES, INC., Bentonville, AR (US)

(72) Inventors: Bhupesh Tuteja, San Jose, CA (US); Shekhar Raj, Sunnyvale, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 672 days.

(21) Appl. No.: 14/993,836

(22) Filed: Jan. 12, 2016

(65) Prior Publication Data

US 2017/0200191 A1 Jul. 13, 2017

(51) Int. Cl.
*G06Q 30/00* (2012.01)
*G06Q 30/02* (2012.01)

(52) U.S. Cl.
CPC .............................. *G06Q 30/0253* (2013.01)

(58) Field of Classification Search
None
See application file for complete search history.

(56) References Cited

U.S. PATENT DOCUMENTS

| | | | | |
|---|---|---|---|---|
| 2013/0275242 | A1* | 10/2013 | Ramaratnam | G06Q 20/202 705/21 |
| 2014/0279222 | A1* | 9/2014 | Lampert | G06Q 30/0625 705/26.35 |
| 2015/0317659 | A1* | 11/2015 | Nayak | G06Q 30/0206 705/7.35 |
| 2016/0350838 | A1* | 12/2016 | Tsao | G06Q 30/0635 |
| 2017/0048672 | A1* | 2/2017 | Herz | H04W 4/029 |
| 2018/0068363 | A1* | 3/2018 | Scholl | G06Q 30/0601 |

* cited by examiner

*Primary Examiner* — Alvin L Brown
(74) *Attorney, Agent, or Firm* — Bryan Cave Leighton Paisner LLP

(57) ABSTRACT

A system and method for providing an eCommerce provider with the ability to efficiently determine, retrieve, and compile rollup information from each vendor using the eCommerce provider is presented. Event are monitored to set a trigger when the event occurs. A rollup can be initiated regarding the item in question. Price and shipping information from each vendor of a particular item is collected and tabulated. Each item from each vendor can be verified to determine if any information is missing or is otherwise incorrect. The offerings from each vendor is ranked by a variety of different criteria. When the item in question is displayed to a user, the vendor being displayed is based on the ranking. Other embodiments also are disclosed.

20 Claims, 5 Drawing Sheets

REAL-TIME STREAMING PROCESSOR TO SERVE HIGH VOLUME TRAFFIC PAGES SUCH AS SEARCH AND RECOMMENDATION

TECHNICAL FIELD

This disclosure relates generally to retail sales, and relates more particularly to internet-based retail sales.

BACKGROUND

Retail sellers often use the Internet to sell goods and services. A large retailer may allow other retailers to sell goods on the large retailer's platform. Such a service gives customers more choices and can lead to better selection and prices. Such a service also allows a small retailer to sell goods to a wide market without the need to set up and advertise its own Internet platform. Accordingly, it is desirable to have a more efficient manner in which a large retailer can provide data to its customers regarding goods being sold on its platform.

BRIEF DESCRIPTION OF THE DRAWINGS

To facilitate further description of the embodiments, the following drawings are provided in which.

Figure 1:
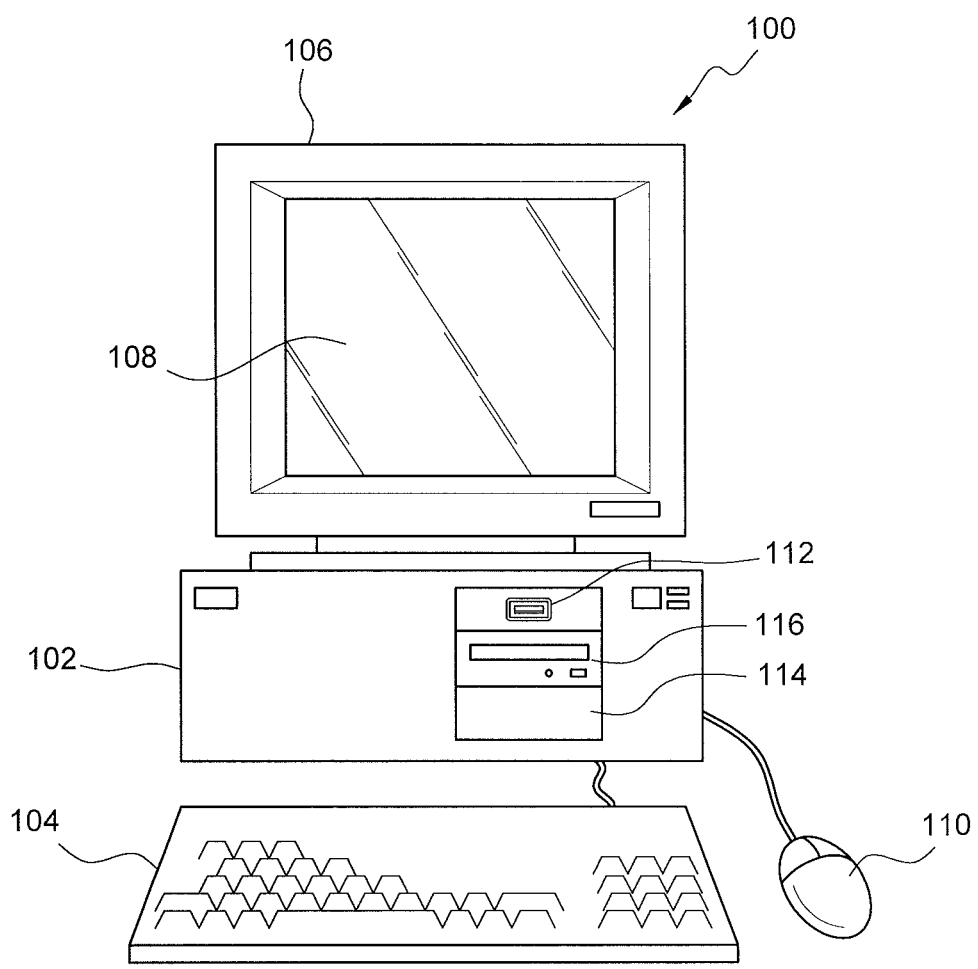
FIG. 1 illustrates a front elevation view of a computer system that is suitable for implementing at least part of a central computer system.

For simplicity and clarity of illustration, the drawing figures illustrate the general manner of construction, and descriptions and details of well-known features and techniques might be omitted to avoid unnecessarily obscuring the present disclosure. Additionally, elements in the drawing figures are not necessarily drawn to scale. For example, the dimensions of some of the elements in the figures might be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but might include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements can be electrically coupled together, but not be mechanically or otherwise coupled together. Coupling can be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Some embodiments include a system. The system can include: one or more processing modules; and one or more non-transitory memory storage modules storing computing instructions configured to run on the one or more processing modules and performs the acts of: detecting the occurrence of an event regarding an item; collecting information from each vendor of a set of vendors regarding the item; receiving a request for which the item is a result; and causing the display of an offer from at least one vendor regarding the item.

Some embodiments include a method. The method can include: detecting the occurrence of an event regarding an item; collecting information from each vendor of a set of vendors regarding the item; receiving a request for which the item is a result; and causing the display of an offer from at least one vendor regarding the item.

Figure 2:
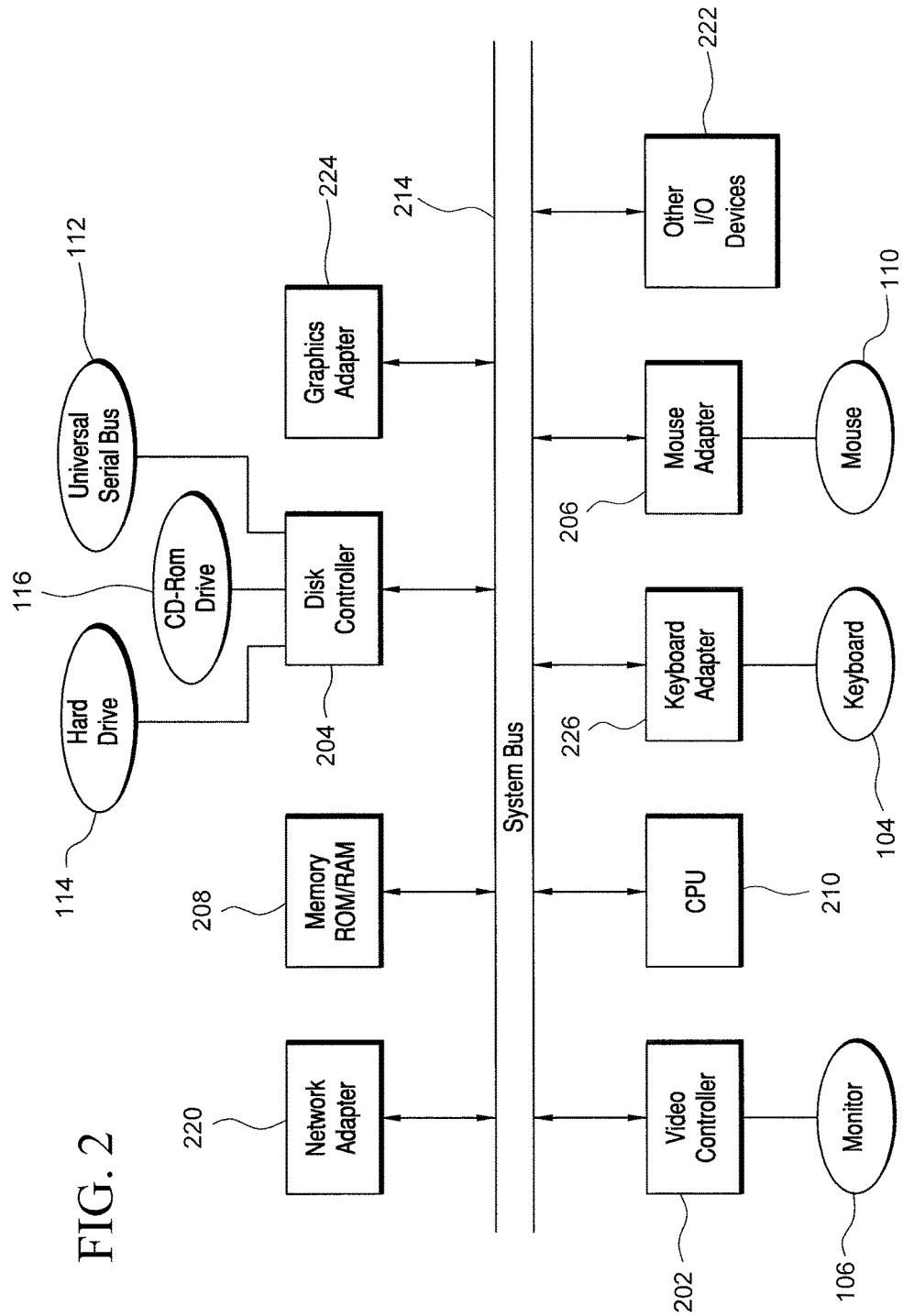
FIG. 2 illustrates a representative block diagram of exemplary elements included on the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a drive 114. Drive 114 can be a hard drive that uses spinning magnetic disks to store data or it can be a solid state drive (SSD) that uses a fast, non-volatile memory for storage. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), drive 114 (FIGS. 1-2), CD-ROM and/or DVD drive 116 (FIGS. 1-2), a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210

(FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
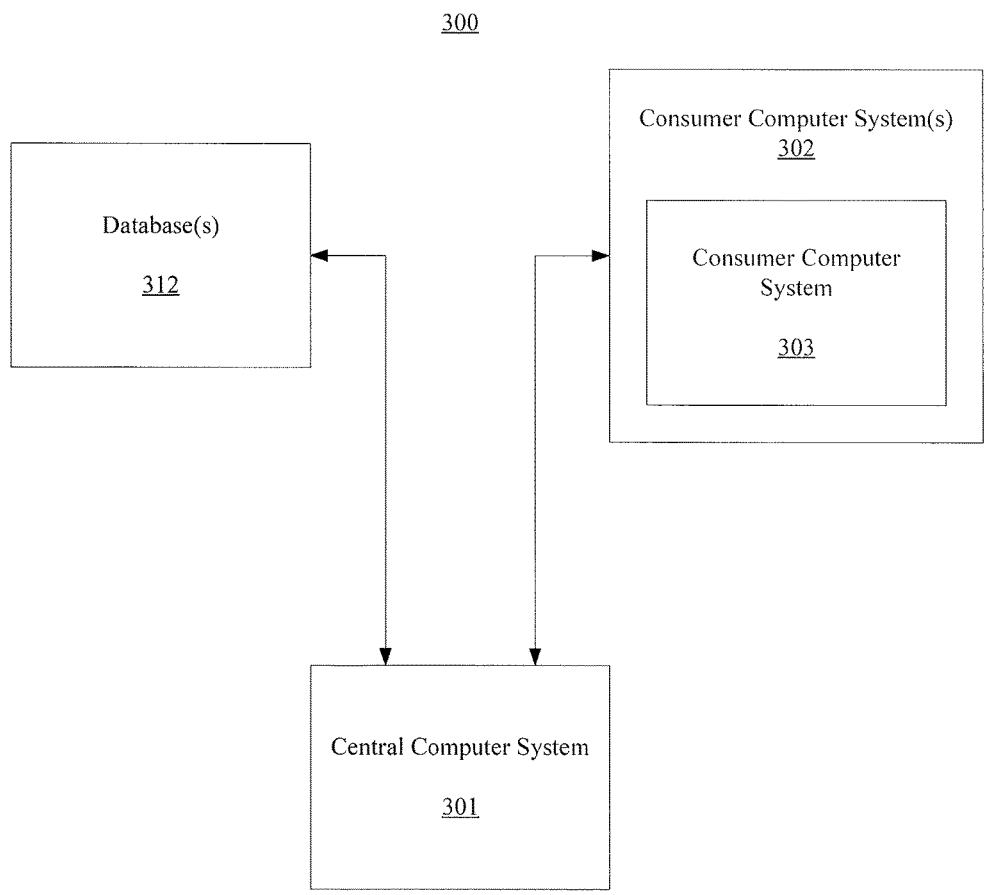
FIG. 3 illustrates a representative block diagram of a system, according to an embodiment.

Skipping ahead now in the drawings, FIG. 3 illustrates a representative block diagram of a system 300, according to an embodiment. System 300 is merely exemplary and embodiments of the system are not limited to the embodiments presented herein. System 300 can be employed in many different embodiments or examples not specifically depicted or described herein. In some embodiments, certain elements or modules of system 300 can perform various methods and/or activities of those methods. In these or other embodiments, the methods and/or the activities of the methods can be performed by other suitable elements or modules of system 300.

As further described in greater detail below, in these or other embodiments, system 300 can proactively (e.g., prospectively) and/or reactively (e.g., responsively) determine and/or communicate the consumer product information to the consumer, as desired. Proactive acts can refer to acts (e.g., identification, determination, communication, etc.) performed without consideration of one or more predetermined acts performed by the consumer and reactive acts can refer to acts (e.g., identification, determination, communication, etc.) performed with consideration of (i.e., in response to) one or more predetermined acts performed by the consumer. For example, in some embodiments, the predetermined act(s) can comprise an act of identifying a selection of a consumer product by the consumer.

Meanwhile, as also described in greater detail below, system 300 can be implemented in brick-and-mortar commerce and/or electronic commerce applications, as desirable. Further, in many of these or other embodiments, system 300 can communicate the consumer product information to the consumer substantially in real-time (e.g., near real-time). Near real-time can mean real-time less a time delay for processing (e.g., determining) and/or transmitting the relevant consumer product information to the relevant consumer. The particular time delay can vary depending on the type and/or amount of the consumer product information, the processing speed(s) of the processing module(s) of system 300, the transmission capability of the communication hardware (as introduced below), the transmission distance, etc. However, in many embodiments, the time delay can be less than approximately one, five, ten, or twenty minutes.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Specifically, system 300 comprises a central computer system 301. In many embodiments, central computer system 301 can be similar or identical to computer system 100 (FIG. 1). Accordingly, central computer system 301 can comprise one or more processing modules and one or more memory storage modules (e.g., one or more non-transitory memory storage modules). In these or other embodiments, the processing module(s) and/or the memory storage module(s) can be similar or identical to the processing module(s) and/or memory storage module(s) (e.g., non-transitory memory storage modules) described above with respect to computer system 100 (FIG. 1). In some embodiments, central computer system 301 can comprise a single computer or server, but in many embodiments, central computer system 301 comprises a cluster or collection of computers or servers and/or a cloud of computers or servers. Meanwhile, central computer system 301 can comprise one or more input devices (e.g., one or more keyboards, one or more keypads, one or more pointing devices such as a computer mouse or computer mice, one or more touchscreen displays, etc.), and/or can comprise one or more display devices (e.g., one or more monitors, one or more touchscreen displays, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of central computer system 301 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of central computer system 301. In a similar manner, the processing module(s) and the memory storage module(s) can be local and/or remote to each other.

In many embodiments, central computer system 301 is configured to communicate with one or more consumer computer systems 302 (e.g., a consumer computer system 303) of one or more consumers. For example, the consumer(s) can interface (e.g., interact) with central computer system 301, and vice versa, via consumer computer system(s) 302 (e.g., consumer computer system 303). Accordingly, in many embodiments, central computer system 301 can refer to a back end of system 300 operated by an operator and/or administrator of system 300, and consumer computer system(s) 302 can refer to a front end of system 300 used by one or more users of system 300 (i.e., the consumer(s)). In these or other embodiments, the operator and/or administrator of system 300 can manage central computer system 301, the processing module(s) of computer system 301, and/or the memory storage module(s) of computer system 301 using the input device(s) and/or display device(s) of central computer system 301. In some embodiments, system 300 can comprise consumer computer system(s) 302 (e.g., consumer computer system 303).

Like central computer system 301, consumer computer system(s) 302 each can be similar or identical to computer system 100 (FIG. 1), and in many embodiments, each of consumer computer system(s) 302 can be similar or identical to each other. In many embodiments, consumer computer system(s) 302 can comprise one or more desktop computer devices, one or more wearable user computer devices, and/or one or more mobile devices, etc. At least part of central computer system 301 can be located remotely from consumer computer system(s) 302.

In some embodiments, a mobile device can refer to a portable electronic device (e.g., an electronic device easily conveyable by hand by a person of average size) with the capability to present audio and/or visual data (e.g., images, videos, music, etc.). For example, a mobile device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can comprise a volume and/or weight sufficiently small as to permit the mobile device to be easily conveyable by hand. For examples, in some embodiments, a mobile device can occupy a volume of less than or equal to approximately 189 cubic centimeters, 244 cubic centimeters, 1790 cubic centimeters, 2434 cubic centimeters, 2876 cubic centimeters, 4056 cubic centimeters, and/or 5752 cubic centimeters. Further, in these embodiments, a mobile device can weigh less than or equal to 3.24 Newtons, 4.35 Newtons, 15.6 Newtons, 17.8 Newtons, 22.3 Newtons, 31.2 Newtons, and/or 44.5 Newtons.

Exemplary mobile devices can comprise, but are not limited to, one of the following: (i) an iPod®, iPhone®, iPod Touch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia®, Surface Pro™, or similar product by the Microsoft Corporation of Redmond, Wash., United States of America, and/or (iv) a Galaxy™, Galaxy Tab™, Note™, or similar product by the Samsung Group of Samsung Town, Seoul, South Korea. Further, in the same or different embodiments, a mobile device can comprise an electronic device configured to implement one or more of (i) the iOS™ operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by Google, Inc. of Mountain View, Calif., United States, (v) the Windows Mobile™, Windows Phone™, and Windows 10 (mobile)™ operating systems by Microsoft Corporation of Redmond, Wash., United States of America, or (vi) the Symbian™ operating system by Nokia Corp. of Keilaniemi, Espoo, Finland.

In further embodiments, central computer system 301 can be configured to communicate with software (e.g., one or more web browsers, one or more mobile software applications, etc.) of the consumer computer system(s) 302 (e.g., consumer computer system 303). For example, the software can run on one or more processing modules and can be stored on one or more memory storage modules (e.g., one or more non-transitory memory storage modules) of the consumer computer system(s) 302 (e.g., consumer computer system 303). In these or other embodiments, the processing module(s) of the consumer computer system(s) 302 (e.g., consumer computer system 303) can be similar or identical to the processing module(s) described above with respect to computer system 100 (FIG. 1). Further, the memory storage module(s) (e.g., non-transitory memory storage modules) of the consumer computer system(s) 302 (e.g., consumer computer system 303) can be similar or identical to the memory storage module(s) (e.g., non-transitory memory storage module(s)) described above with respect to computer system 100 (FIG. 1). Exemplary web browsers can include (i) Firefox® by the Mozilla Organization of Mountain View, Calif., United States of America, (ii) Internet Explorer® by the Microsoft Corp. of Redmond, Wash., United States of America, (iii) Chrome™ by Google Inc. of Menlo Park, Calif., United States of America, (iv) Opera® by Opera Software of Oslo, Norway, and (v) Safari® by Apple Inc. of Cupertino, Calif., United States of America.

Meanwhile, in many embodiments, central computer system 301 also can be configured to communicate with one or more databases 312. The database can comprise a product database that contains information about products sold by a retailer. Database(s) 312 can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of database(s) 312, that particular database can be stored on a single memory storage module of the memory storage module(s) and/or the non-transitory memory storage module(s) storing database(s) 312, or it can be spread across multiple ones of the memory storage module(s) and/or non-transitory memory storage module(s) storing database(s) 312, depending on the size of the particular database and/or the storage capacity of the memory storage module(s) and/or non-transitory memory storage module(s).

In these or other embodiments, the memory storage module(s) of central computer system 300 can comprise some or all of the memory storage module(s) storing database(s) 312. In further embodiments, some of the memory storage module(s) storing database(s) 312 can be part of consumer computer systems 302 and/or one or more third-party computer systems (i.e., other than central computer system 301 and consumer computer systems 302), and in still further embodiments, all of the memory storage module(s) storing database(s) 312 can be part of consumer computer systems 302 and/or the third-party computer system(s). Like central computer system 301 and consumer computer system(s) 302, when applicable, each of the third-party computer system(s) can be similar or identical to computer system 100 (FIG. 1). Notably, the third-party computer systems are omitted from the drawings to better illustrate that database(s) 312 can be stored at memory storage module(s) of central computer system 301, consumer computer system(s) 302, and/or the third-party computer systems, depending on the manner in which system 300 is implemented.

Database(s) 312 each can comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between central computer system 301, consumer computer system(s) 302 (e.g., consumer computer system 303), and/or database(s) 312 can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc. Exemplary LAN and/or WAN protocol(s) can comprise Data Over Cable Service Interface Specification (DOCSIS), Institute of Electrical and Electronic Engineers (IEEE) 802.3 (also known as Ethernet), IEEE 802.11 (also known as WiFi), etc. Exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, and the like. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.)

For convenience, the functionality of system 300 is described herein as it relates particularly to consumer computer system 303 and a single consumer. But in many embodiments, the functionality of system 300 can be extended to each of consumer computer system(s) 302 and/or to multiple consumers. In these extended examples, in some embodiments, single consumers can interface (e.g., interact) with central computer system 301 with multiple consumer computer systems of consumer computer system(s) 302 (e.g., at different times). For example, a consumer could interface with central computer system 301 via a first consumer computer system (e.g., a desktop computer), such as, for example, when interfacing with central computer system 301 from home, and via a second consumer computer system (e.g., a mobile device), such as, for example, when interfacing with central computer system 301 away from home.

Large electronic commerce ("eCommerce") retailers offer a variety of goods for sale on their platforms, accessible via web pages or mobile apps. A large retailer might allow vendors (such as other retailers) to sell goods on its platform. For example, Amazon, Newegg, and Walmart each have versions of a "marketplace," in which other vendors can sell their goods on the large eCommerce retailer's platform.

There are a variety of benefits to such an arrangement. A vendor is able to take advantage of the large retailer's user base, electronic infrastructure, and payment processing capabilities. Thus, the vendor would not need to develop a website, advertise the website, and deal with payment processors. The vendor would only need to place their goods on the eCommerce retailer's platform. The eCommerce retailer benefits by having additional selection available and might collect a commission from the vendor. Users are able to benefit from the additional selection and from the fact that multiple vendors might be competing with each other on price, without having the need to create an account for the vendors they wish to compare.

One task that should be managed with the use of marketplace sellers are rollups. As discussed above, a marketplace allows one or more sellers to advertise and sell their goods on the eCommerce site of another. The large eCommerce retailer that is hosting marketplace sellers wants to be able to display items for sale to its customers. The process of compiling a list of all vendors can be time consuming and/or processor intensive.

There are many times when information should be displayed to users. These times include search results, product recommendations, and a checkout page. There are many sources of the information being displayed to users. These sources can include a special offer database, product database, price database, availability database, shipping information database, and rollup information. Rollup information might include information from each vendor of a particular product. Each product might have dozens or even hundreds of vendors offering the product. Each vendor might have a different price, different availability, and different shipping prices and policies. In addition, when aggregating such results, the results are often filtered or sorted to determine which vendors' offers provide the best value to the user.

Two popular methods of determining rollup information are run-time and pre-calculated. Each method has its drawbacks.

Run-time determination of rollups is when rollups are determined when needed. That is, when a search result is retrieved or when a special offer is displayed, the rollups related to the product in question are determined, and then displayed to the user. A problem associated with this method is that determining rollups can be time-consuming. During busy shopping seasons (e.g., late November through December), there can be many searches (on the order of hundreds of millions per day), where each search result might result in the determination of rollups. There also are other displays of products. For example, when a user selects an item to view, there might be a listing of "recommended items" shown to the user. For each of the recommended items, there might be a desire to show the user offerings from one or more vendors. Thus, rollups might be used to display those offerings. Even if each determination of rollups is relatively small, the determination of so many rollups for each search can lead to poor website performance during high-traffic periods.

On the other hand, batch processing determination of rollups is when rollups are performed for at least a subset of products on a periodic basis, such as once per day. Between the periods, the batch processed rollups are displayed as search results when appropriate. While this method alleviates the performance problems described above, stale results can occur with such a method. Stale results include, for example, displaying vendors as having a product when that vendor has sold out of the product, or displaying incorrect prices after the vendor has changed the prices. Especially during high volume season, product availability information is especially vulnerable to becoming stale.

Figure 4:
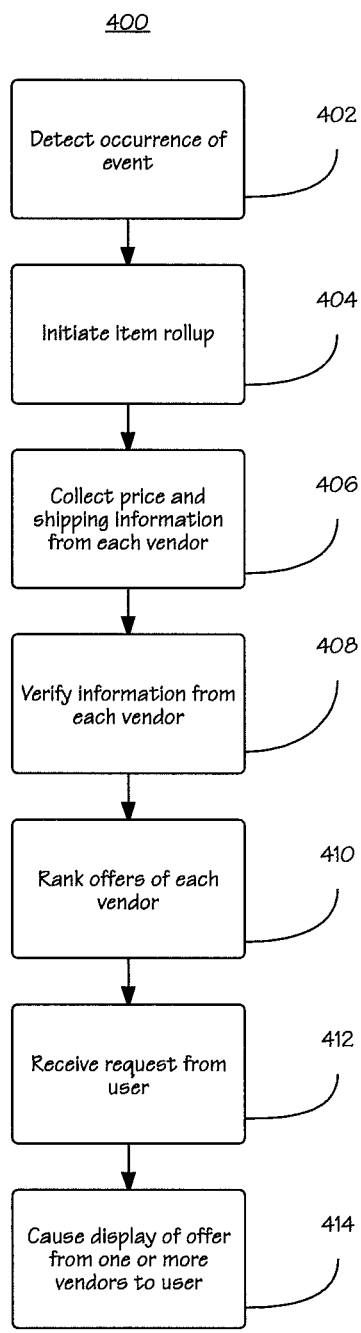
FIG. 4 is a flowchart illustrating the operation of an embodiment.

A flowchart illustrating a method 400 of determining, compiling, and displaying rollups is presented in FIG. 4. Method 400 is merely exemplary and is not limited to the embodiments presented herein. Method 400 can be employed in many different embodiments or examples not specifically depicted or described herein. In some embodiments, the procedures, the processes and/or the activities of method 400 can be performed in the order presented. In other embodiments, the procedures, the processes, and/or the activities of method 400 can be performed in any other suitable order. In still other embodiments, one or more of the procedures, the processes, and/or the activities of method 400 can be combined or skipped. In some embodiments, portions of method 400 can be implemented by computer system 100 (FIG. 1).

Method 400 might be executed by an eCommerce retailer selling a variety of different products from multiple vendors. Method 400 might also be executed by one interested in selling services or doing promotions for other reasons.

An embodiment can be configured to update rollup information upon various events. Upon the occurrence of one of these events, rollup information can be determined. In such a manner, previously mentioned drawbacks are avoided— information is current because rollup information is determined upon the occurrence of certain events, yet calculations are not as intense because such a determination need not be performed every single time a search or recommendation page is created.

An event monitor is used to detect when certain events occur (block 402). A trigger can be set when an event is detected. There are a variety of different events that can be detected. Exemplary events that can be monitored can include inventory events, including the addition or deletion of an item by a vendor. Monitored events can also include price changes, grouping changes (e.g., the creation of new bundle by a vendor), and shipping changes. Shipping changes can include changes to shipping policies or shipping rates.

Detection can occur in one of a variety of different methods, including those presently known in the art and methods developed in the future. For example, certain databases can be monitored to determine when an event occurs. A vendor might perform various tasks that can affect one or more databases. For example, a vendor might start offering an item for sale. Doing so creates an entry in a vendor database, which might set a flag regarding the item. The database can be monitored such that a change in one or more fields of the database causes a flag to be set. The database being monitored can be a database containing information submitted by one or more vendors.

After receiving a trigger indicating an event, an item rollup is initiated (block 404). The item rollup process involves the processing of a certain item such that every offer of the item by each vendor from a set of vendors is collected. The price and shipping information of the item from each vendor is collected and tabulated (block 406). For each vendor, it can be verified that complete information is available (block 408). This block can be called a product publishing algorithm. The product publishing algorithm serves to ensure that each offer of the item is correct and complete. Incorrect or incomplete information can be flagged such that the vendor is made aware of the presence of incorrect information, and the incorrect item listing can be prevented from being shown to a user. Examples of incorrect or incomplete information can include missing data (e.g., lack of price information, shipping information, or quantity information), a price that is vastly different from other offers (e.g., offering a product for $30 when all other offers of the same product is over $300), and the like. A variety of different standards can be used to determine if information is incorrect. For example, a price that is 50% of the average price of the item might be deemed acceptable for certain products, but a price that is 10% of the average price might be considered a mistake, causing an embodiment to make an inquiry.

An offer ranking algorithm is executed (block 410). The offer ranking algorithm serves to rank the various offers of an item such that only the best offers are displayed to a user. Offers can be ranked in a variety of different manners, such as only by price or by price and shipping costs.

In some embodiments, a user might be able to rate a vendor based on the user's experiences with the vendor. Such ratings can be compiled such that each vendor has an overall rating. This overall rating of the vendor can be taken into account such that a vendor with low ratings might be ranked lower than another vendor, even if the low-rated vendor has lower prices. A ranking also might include factors such as shipping time (e.g., a vendor with a longer shipping time might be ranked lower than a vendor with a shorter shipping time), return policy (e.g., a vendor with a policy of not accepting returns might be ranked lower, and the like. Aspects of ranking might be selectable by a user, such that a user might be able to ignore shipping times or vendor ratings.

Upon the receipt of a request from a user (block 412), the rankings are used to display results to the user (block 414). There are several different methods in which a user can make a request. Typically, an eCommerce provider will make its eCommerce system available to users, such as through a website, a mobile app, and the like. A request can come in the form of a search term entered by a user. A request also can be in the form of a listing of recommended items that is displayed on another page. A request can be in the form of a page featuring special offers. A request can be in the form of a ranking of top-selling items. Requests can be made in a variety of other methods, now known or developed in the future. The displaying block can occur in a variety of different ways. For example, instructions can be transmitted that cause a user's computing device to display results to a user. In an embodiment using a web browser, the instructions can include hypertext markup language ("HTML") or other markup languages that cause a web browser to display the results. Similar instructions can be sent to an app for a mobile electronic device that causes the display of results.

The display to the user of an offer can be offers from a subset of vendors chosen from the set of vendors that sell the item. In some embodiments, the subset of vendors might comprise a single vendor. In some embodiments, the subset of vendors might comprise more than one vendor (e.g., the top 10 vendors). The offer being displayed to the user can include the price of the item, shipping costs, and shipping terms (overnight, $2^{nd}$ day, etc.).

Figure 5:
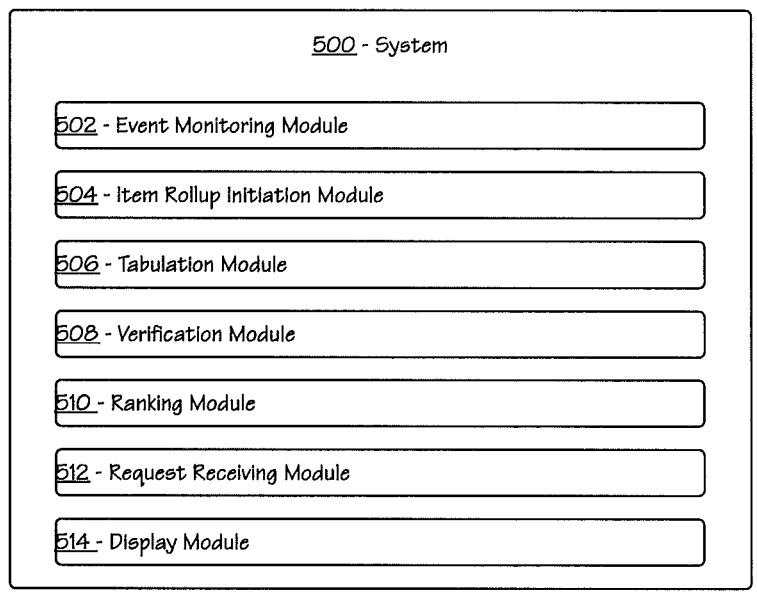
FIG. 5 is a block diagram illustrating a system capable of performing an embodiment.

Turning ahead in the figures, FIG. 5 illustrates a block diagram of a system 500 that is capable of performing disclosed embodiments. System 500 is merely exemplary and is not limited to the embodiments presented herein. System 500 can be employed in many different embodiments or examples not specifically depicted or described herein. In some embodiments, certain elements or modules of system 500 can perform various procedures, processes, and/or acts. In other embodiments, the procedures, processes, and/or acts can be performed by other suitable elements or modules.

In a number of embodiments, system 500 can include event monitoring module 502. In certain embodiments, event monitoring module 502 can perform block 402 (FIG. 4) of monitoring events.

In a number of embodiments, system 500 can include item rollup initiation module 504. In certain embodiments, item rollup initiation module 504 can perform block 404 (FIG. 4) of initiating an item rollup.

In a number of embodiments, system 500 can include tabulation module 506. In certain embodiments, tabulation module 506 can perform block 406 (FIG. 4) of collecting and tabulating price and shipping information from each vendor.

In a number of embodiments, system 500 can include verification module 508. In certain embodiments, verification module 508 can perform block 408 (FIG. 4) of verifying the information from each vendor.

In a number of embodiments, system 500 can include ranking module 510. In certain embodiments, ranking module 510 can perform block 410 (FIG. 4) of ranking offers.

In a number of embodiments, system 500 can include request receiving module 512. In certain embodiments, request receiving module 512 can perform block 412 (FIG. 4) of receiving a request from a user.

In a number of embodiments, system 500 can include display module 514. In certain embodiments, display module 514 can perform block 414 (FIG. 4) of displaying results to a user.

Although the above embodiments have been described with reference to specific embodiments, it will be understood by those skilled in the art that various changes can be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 can be modified, and that the foregoing discussion of certain of these embodiments does not necessarily represent a complete description of all possible embodiments. For example, one or more of the procedures, processes, or activities of FIGS. 1-5 can include different procedures, processes, and/or activities and be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that can cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processing modules; and
one or more non-transitory memory storage modules storing computing instructions configured to run on the one or more processing modules and perform acts of:
  detecting an occurrence of an event regarding an item by monitoring one or more fields of a database to find a change to at least one of the one or more fields;
  collecting respective information from each respective vendor of a set of vendors regarding the item, the respective information coming from the one or more fields of the database;
  determining when any of the respective information is missing for at least one vendor of the set of vendors by determining that the event regarding the item comprises a deletion of one or more entries in the one or more fields of the database;
  when any of the respective information is missing for the at least one vendor of the set of vendors, flagging the one or more fields of the database comprising the deletion of the one or more entries;
  transmitting, to the at least one vendor of the set of vendors, a notification indicating that the one or more fields of the database is flagged;
  after transmitting the notification, receiving, from the at least one vendor of the set of vendors, updated information regarding the item;
  overwriting the one or more fields of the database with the updated information regarding the item;
  after overwriting the one or more fields of the database, receiving, from a user, a request for which the item is a result; and
  after receiving the request, causing a display, for the user, of an offer from the at least one vendor regarding the item, the offer comprising the updated information regarding the item.

2. The system of claim 1, wherein:
the respective information comprises respective price information and respective shipping information for the item from each respective vendor in the set of vendors; and
the computing instructions are further configured to perform an act of:
  verifying the respective information from each respective vendor of the set of vendors.

3. The system of claim 2, wherein:
verifying the respective information from each respective vendor of the set of vendors comprises:
  determining when the respective price information for the item from each respective vendor of the set of vendors is within a predetermined range based on an average price of the set of vendors for the item; and
  notifying a respective vendor of a presence of price out-of-range information.

4. The system of claim 1, wherein the computing instructions are further configured to perform an act of:
assigning a respective ranking to each respective vendor of the set of vendors based on the respective information, wherein:
  causing the display, for the user, of the offer comprises using the respective ranking to determine which subset of vendors of the set of vendors comprise the at least one vendor.

5. The system of claim 4, wherein:
causing the display, for the user, of the offer comprises causing the display, for the user, of the respective price information and the display of respective shipping information for the item from each respective vendor of the set of vendors.

6. The system of claim 4, wherein:
the respective information includes a respective average user rating for each respective vendor of the set of vendors.

7. The system of claim 6, wherein:
the respective ranking is based on an overall price comprising the respective price information and respective shipping information for the item from each respective vendor of the set of vendors to determine a vendor with a lowest overall price.

8. The system of claim 1, wherein:
the respective information comprises respective availability information that indicates, for each respective vendor of the set of vendors, when a respective vendor is able to fulfill an order for the item.

9. The system of claim 1, wherein:
the computing instructions are further configured to perform acts of:
    determining when respective price information for the item from each respective vendor of the set of vendors is within a predetermined range based on an average price of the set of vendors for the item;
    notifying a respective vendor of a presence of price out-of-range information; and
    assigning a respective ranking to each respective vendor of the set of vendors based on the respective information;
causing the display, for the user, of the offer comprises using the respective ranking to determine which subset of vendors of the set of vendors comprise the at least one vendor;
causing the display, for the user, of the offer comprises causing the display, for the user, of the respective price information and the display of respective shipping information for the item from each respective vendor of the set of vendors;
the respective information comprises a respective average user rating for each respective vendor of the set of vendors;
the respective ranking is based on an overall price comprising the respective price information and the respective shipping information for the item to determine a vendor with a lowest overall price;
the respective information comprises respective availability information that indicates, for each respective vendor of the set of vendors, when the respective vendor is able to fulfill an order for the item; and
the respective information comprises the respective price information and the respective shipping information for the item from each respective vendor in the set of vendors.

10. A method comprising:
detecting an occurrence of an event regarding an item by monitoring one or more fields of a database to find a change to at least one of the one or more fields;
collecting respective information from each respective vendor of a set of vendors regarding the item, the respective information coming from the one or more fields of the database;
determining when any of the respective information is missing for at least one vendor of the set of vendors by determining that the event regarding the item comprises a deletion of one or more entries in the one or more fields of the database;
when any of the respective information is missing for the at least one vendor of the set of vendors, flagging the one or more fields of the database comprising the deletion of the one or more entries;
transmitting, to the at least one vendor of the set of vendors, a notification indicating that the one or more fields of the database is flagged;
after transmitting the notification, receiving, from the at least one vendor of the set of vendors, updated information regarding the item;
overwriting the one or more fields of the database with the updated information regarding the item;
after overwriting the one or more fields of the database, receiving, from a user, a request for which the item is a result; and
after receiving the request, causing a display, for the user, of an offer from the at least one vendor regarding the item, the offer comprising the updated information regarding the item.

11. The method of claim 10, further comprising:
verifying the respective information from each respective vendor of the set of vendors, wherein:
    the respective information comprises respective price information and respective shipping information for the item from each respective vendor in the set of vendors.

12. The method of claim 11, wherein:
verifying the respective information from each respective vendor of the set of vendors comprises:
    determining when the respective price information for the item from each respective vendor of the set of vendors is within a predetermined range based on an average price of the set of vendors for the item; and
    notifying a respective vendor of a presence of price out-of-range information.

13. The method of claim 10 further comprising:
assigning a respective ranking to each respective vendor of the set of vendors based on the respective information, wherein:
    causing the display, for the user, of the offer comprises using the respective ranking to determine which subset of vendors of the set of vendors comprise the at least one vendor.

14. The method of claim 13, wherein:
causing the display, for the user, of the offer comprises causing the display, for the user, of the respective price information and the display of respective shipping information for the item from each respective vendor of the set of vendors.

15. The method of claim 4, wherein:
the respective information includes a respective average user rating for each respective vendor of the set of vendors.

16. The method of claim 15, wherein:
the respective ranking is based on an overall price comprising the respective price information and respective shipping information for the item from each respective vendor of the set of vendors to determine a vendor with a lowest overall price.

17. The method of claim 10, wherein:
the respective information comprises respective availability information that indicates, for each respective vendor of the set of vendors, when a respective vendor is able to fulfill an order for the item.

18. The method of claim 10 further comprising:
determining when respective price information for the item from each respective vendor of the set of vendors is within a predetermined range based on an average price of the set of vendors for the item;

notifying a respective vendor of a presence of price out-of-range information;

assigning a respective ranking to each respective vendor of the set of vendors based on the respective information, wherein:

the respective information comprises the respective price information and respective shipping information for the item from each respective vendor in the set of vendors;

causing the display, for the user, of the offer comprises using the respective ranking to determine which subset of vendors of the set of vendors comprise the at least one vendor;

causing the display, for the user, of the offer comprises causing the display, for the user, of the respective price information and the display of the respective shipping information for the item from each respective vendor of the set of vendors;

the respective information comprises a respective average user rating for each respective vendor of the set of vendors;

the respective ranking is based on an overall price comprising the respective price information and the respective shipping information for the item to determine a vendor with a lowest overall price; and the respective information comprises respective availability information that indicates, for each respective vendor of the set of vendors, when the respective vendor is able to fulfill an order for the item.

19. The system of claim 1, wherein:

the one or more fields of the database comprise data regarding at least one of:

a price of the item;

a group composition for a group comprising the item;

a shipping price of the item; or shipping policies of the at least one vendor of the set of vendors.

20. The method of claim 10, wherein:

the one or more fields of the database comprise data regarding at least one of:

a price of the item;

a group composition for a group comprising the item;

a shipping price of the item; or shipping policies of the at least one vendor of the set of vendors.

\* \* \* \* \*